(12) United States Patent
Li

(10) Patent No.: US 8,189,547 B2
(45) Date of Patent: May 29, 2012

(54) SELF-CONFIGURATION OF WIRELESS ACCESS DEVICES IN A WIRELESS NETWORK ENVIRONMENT

(75) Inventor: Aihua Edward Li, Cupertino, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 874 days.

(21) Appl. No.: 12/255,445

(22) Filed: Oct. 21, 2008

(65) Prior Publication Data

US 2010/0098036 A1  Apr. 22, 2010

(51) Int. Cl.
*H04W 4/00* (2009.01)
(52) U.S. Cl. .................. 370/338; 370/330; 455/450
(58) Field of Classification Search .............. None
See application file for complete search history.

(56) References Cited

U.S. PATENT DOCUMENTS

| | | | |
|---|---|---|---|
| 2003/0181213 A1* | 9/2003 | Sugar et al. | 455/454 |
| 2005/0026611 A1* | 2/2005 | Backes | 455/434 |
| 2005/0090250 A1* | 4/2005 | Backes | 455/434 |
| 2006/0089138 A1* | 4/2006 | Smith et al. | 455/426.1 |
| 2008/0031155 A1* | 2/2008 | Korus et al. | 370/254 |
| 2008/0285488 A1* | 11/2008 | Walton et al. | 370/280 |

* cited by examiner

*Primary Examiner* — Bob Phunkulh

(57) ABSTRACT

A self-configuration method for access devices in a wireless network begins by performing wireless data collection with the access devices during an automated calibration period. During this time, each access device receives beacons from one or more transmitting access devices, the beacons being transmitted and received using a plurality of different channels available to the wireless network. The method records radio frequency (RF) data associated with the received beacons, and processes the RF data to select, from the plurality of different channels, a respective channel for each of the access devices. In addition, the RF data is processed to adjust transmit power levels for the access devices. The selected channels and adjusted transmit power levels are then used as configuration settings for the access devices.

12 Claims, 7 Drawing Sheets

SELF-CONFIGURATION OF WIRELESS ACCESS DEVICES IN A WIRELESS NETWORK ENVIRONMENT

TECHNICAL FIELD

Embodiments of the subject matter described herein relate generally to wireless networks. More particularly, embodiments of the subject matter relate to self-configuration techniques for establishing wireless operating parameters for access devices in a wireless local area network.

BACKGROUND

Wireless radio frequency (RF) network architectures, wireless local area networks (WLANs), and wireless network devices and accessories are becoming increasingly popular. WLANs can give mobile computing clients the ability to "roam" or physically move from place to place without being connected by wires. In the context of a WLAN, the term "roaming" describes the act of physically moving between wireless access devices, which may be stand-alone wireless access points, wireless access ports that cooperate with one or more wireless switches located in the WLAN, or other suitably configured devices or components. Many deployments of wireless computer infrastructure, such as WLANs, involve the use of multiple wireless switches serving a number of wireless access devices.

Some wireless network administrators utilize software-based tools for purposes of planning, managing, diagnosing, and monitoring WLANs. Planning features in software of this type can generate RF coverage maps in conjunction with the floor plan in which the WLAN will be deployed. Such planning features allow the network administrator to determine how best to provide for RF coverage in the floor plan. However, such planning software relies on RF models for purposes of RF coverage estimations. The use of RF models can be useful to provide a baseline configuration, but RF models may not accurately account for real world operating characteristics and variations caused by the environment. Moreover, even if planning software is utilized, the wireless access devices still need to be manually configured with their respective RF operating characteristics, namely, the wireless channel and the transmit power level. Such manual configuration can be time consuming and costly, especially if the wireless network deployment includes a large number of wireless access devices.

BRIEF SUMMARY

A self-configuration method for access devices in a wireless network is provided. The method performs wireless data collection with the access devices during an automated calibration period, wherein each of the access device receives beacons from one or more transmitting access devices. The beacons are transmitted and received using a plurality of different channels available to the wireless network. The method also involves recording radio frequency (RF) data associated with beacons received during the wireless data collection, selecting, from the plurality of different channels, a respective channel for each of the access devices, and adjusting transmit power levels for the access devices.

The above and other aspects may be carried out in a wireless local area network (WLAN) comprising a plurality of access devices that support wireless communication with devices within the WLAN, and comprising a controller communicatively coupled to the plurality of access devices. A self-configuration method is provided for establishing wireless operating characteristics of the plurality of access devices. This method involves: the controller commanding the access devices to transmit test beacons at specified transmit power levels and on specified channels; the access devices receiving the test beacons; and recording RF data associated with received test beacons. The method continues by processing the RF data to assign channels to the access devices, processing the RF data and the assigned operating channels to determine adjusted transmit power levels for the access devices, and configuring the access devices for operation using the assigned operating channels and the adjusted transmit power levels.

An embodiment of a method of automatically establishing operating characteristics for a plurality of access devices in a wireless network is also provided. The method automatically collects, using the access devices, radio frequency (RF) test data indicative of RF distance between transmitting and receiving access devices in the wireless network, temporarily assigns channels to the access devices, based upon processing of the RF test data and based upon initial transmit power levels for the access devices, and determines adjusted transmit power levels for the access devices, based upon processing of the RF test data, and based upon the temporarily assigned channels. The method continues by temporarily reassigning channels to the access devices, based upon processing of the RF test data and based upon the adjusted transmit power levels, and determining readjusted transmit power levels for the access devices.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
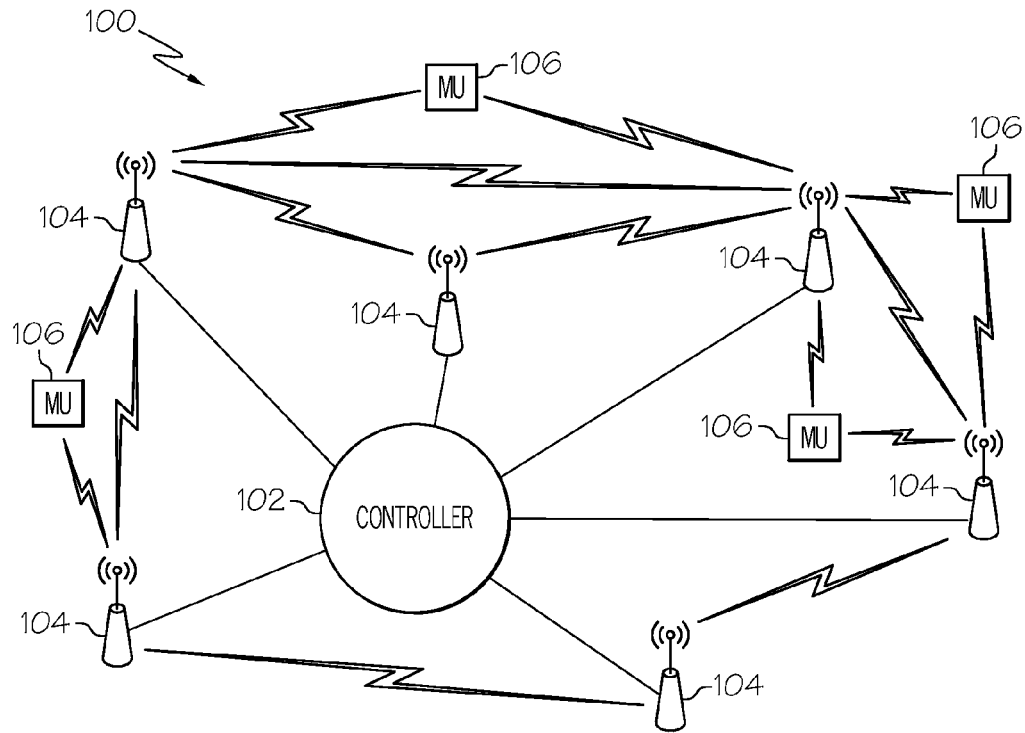
FIG. 1 is a schematic representation of wireless network infrastructure components, including wireless access devices and a controller.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematics shown in the figures might depict exemplary arrangements of elements, additional intervening elements, devices, features, or components may be present in an embodiment of the depicted subject matter.

For the sake of brevity, conventional techniques related to WLAN design, topologies, and operation, wireless data communication, wireless network infrastructure components, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the subject matter.

It is not uncommon for a wireless network on a site to have tens to hundreds of wireless access devices. When deploying a wireless network on such a scale, it is important to configure a number of RF parameters for each radio transmitter, such as: (1) the operating channel, which is selected from among a set of different channels that are available to the wireless network; (2) the transmit power settings; and (3) the desired rescuing power needed to compensate for a neighboring access device that has failed. In an ideal deployment without any external interference from other wireless networks or wireless devices, adjacent access devices should operate on non-overlapping frequency channels. In addition, it is desirable to have each access device transmit at a particular power level that is high enough to provide adequate coverage and is low enough to not interfere with nearby access devices that are operating on the same channel.

However, it can be very tedious and time consuming to actually achieve such preferred settings. Site planning tools and software can recommend some configuration settings based upon a theoretical analysis of the site environment. However, such recommendations may not be completely accurate because the supplied site parameters may not precisely reflect the true operating environment, and because the operating environment itself may change from time to time. Consequently, network administrators often walk around the site gathering signal quality information for purposes of manual readjustment and reconfiguration at a later time.

The techniques and procedures described herein can be used in lieu of manual RF parameter configuration for each individual access device. Indeed, a network administrator can simply initiate the self-calibration procedure, which then automatically collects the site measurement data and provides the desired configuration settings in a few seconds. Furthermore, this procedure can be scheduled to run at any desired time to enable ongoing adaptation of the wireless network to changing environmental conditions.

FIG. 1 is a schematic representation of wireless network infrastructure components, which may be deployed in a WLAN 100. This simplified embodiment of WLAN 100 employs a controller 102 and a plurality of wireless access devices 104, each of which is communicatively coupled to controller 102. WLAN 100 can support wireless clients or MUs 106 using wireless access devices 104. WLAN 100 may also include or communicate with any number of additional network components, such as a traditional local area network ("LAN"). Depending upon the deployment, WLAN 100 may have any number of wireless switches (including zero), each supporting any number of wireless access devices, and each wireless access device supporting any number of MUs 106. Indeed, the topology and configuration of WLAN 100 can vary to suit the needs of the particular application and FIG. 1 is not intended to be limiting in any way.

As used here, a wireless access device 104 could be realized as a wireless access port, which is a "thin" device that relies on the network intelligence and management functions provided by controller 102 and/or at least one wireless switch (not shown). Alternatively, a wireless access device 104 could be realized as a wireless access point, which is a "thick" device having some network intelligence and processing power integrated therein. Wireless access devices 104 preferably support a number of conventional wireless data communication operations, and conventional wireless access devices are available from Motorola, Inc. and other suppliers. Briefly, each wireless access device 104 is suitably configured to receive data from MUs 106 and from other wireless access devices 104 over wireless links (the wireless links are represented by the lightning bolts in FIG. 1). Once the data is captured by a wireless access device 104, the data can be processed for communication within WLAN 100. For example, the data can be encapsulated into a packet format compliant with a suitable data communication protocol. In certain embodiments, data can be routed within WLAN 100 using conventional Ethernet 802.3 formatting (including standard Ethernet destination and source packet addresses).

Controller 102 could be implemented in a wireless switch, in a wireless access device 104, or in any suitable component in WLAN 100. The illustrated embodiment of controller 102 is communicatively coupled to each wireless access device 104 via a bidirectional data communication link. In alternate embodiments, controller 102 can be coupled to one or more wireless access devices 104 indirectly, e.g., a first wireless access device could relay data from a second wireless access device to controller 102. Depending upon the particular implementation, controller 102 communicates with a wireless access device 104 using wireless data transport techniques and/or using a wired connection. Moreover, controller 102 may be coupled to an Ethernet switch (not shown), which is in turn coupled to wireless access devices 104. This arrangement would allow controller 102 to communicate with wireless access devices 104 via the Ethernet switch.

Figure 2:
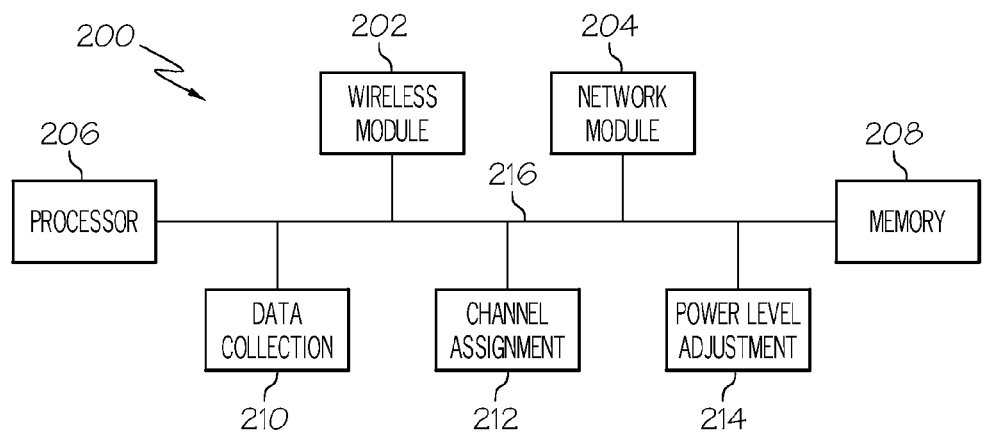
FIG. 2 is a schematic representation of an embodiment of a controller suitable for use in a wireless network.

Controller 102 is suitably configured to carry out a number of centralized operations, processes, and protocols associated with the automated configuration and setup of wireless access devices 104 (as described in more detail below). In this regard, FIG. 2 is a schematic representation of an embodiment of a controller 200 suitable for use in a wireless network such as WLAN 100 (indeed, controller 102 may be configured in accordance with the following description of controller 300). The depicted embodiment of controller 200 includes, without limitation: a wireless module 202; a network module 204; a processor 206; an appropriate amount of memory implemented in at least one memory element 208; and functional modules associated with wireless data collection 210, channel assignment 212, and power level adjustment 214. These elements and modules may be interconnected using a data/control bus 216 or any suitably configured interconnection architecture or arrangement.

Wireless module 202 represents the hardware, software, and/or firmware that is responsible for handling wireless data communication for controller 102. Thus, wireless module 202 preferably includes an RF radio, RF front end components, interface components, and at least one antenna that supports wireless data communication. Although not required in all embodiments, wireless module 202 is preferably configured to support common wireless protocols, such as 802.11 (any variation thereof).

Network module 204 represents the hardware, software, and/or firmware that is responsible for handing network (non-wireless) data communication for controller 102. In practice, network module 204 may include wire or cable interface ports, plugs, or connectors, and associated logic. As mentioned previously, network module 204 may be suitably configured to support Ethernet data communication for controller 102.

Processor 206 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. Processor 206 may be realized as a microprocessor, a controller, a microcontroller, or a state machine. Moreover, processor 206 may be implemented as a combination of computing devices, e.g., a combination of a digital signal processor and a microprocessor, a plurality of microprocessors, one or more microprocessors in conjunction with a digital signal processor core, or any other such configuration.

Memory element 208 may be volatile (such as RAM), non-volatile (such as flash memory, etc.) or a combination thereof. In this regard, memory element 208 can be coupled to processor 206 such that processor 206 can read information from, and write information to, memory element 208. In the alternative, memory element 208 may be integral to processor 206. As an example, processor 206 and memory element 208 may reside in an ASIC. Memory element 208 supports the self-configuration techniques described herein by storing and recording data that is collected in response to diagnostic operation of the wireless access devices.

FIG. 2 depicts functional modules that represent processing logic and/or programmed methodologies utilized for data collection 210, channel assignment 212, and power level adjustment 214. In practice, this functionality can be implemented in or performed by processor 206. FIG. 2 shows these functional blocks as distinct operating modules for ease of description. These operations are described in more detail below with reference to FIGS. 3-8.

It should be appreciated that each wireless access device 104 may be configured in a manner similar to that described above for controller 200. In particular, a wireless access device 104 may include components and elements that are equivalent to: wireless module 202; network module 204; processor 206; and memory element 208. Moreover, a wireless access device 104 that is compatible with the self-configuration technique will include equivalent processing modules to support channel assignment and power level adjustment in response to commands issued by controller 102.

Although not intended to limit or restrict the scope of the disclosed subject matter, the following description assumes that wireless signals propagate in accordance with a propagation model that is represented by this expression:

$$RSSI(\text{dBm}) = P_{TX} + G_{TX} + G_{RX} - \text{path\_loss} - MP_{CORRECTION} - \sum_{i=1}^{M} \text{barrier\_loss}_i$$

In this expression: $P_{TX}$ is the transmit power in dBm; $G_{TX}$ is the transmit antenna gain in dBi; $G_{RX}$ is the receive antenna gain in dBi; $MP_{CORRECTION}$ is the multipath correction headroom if specified by the user (this parameter is usually considered to be zero); and barrier_loss is the attenuation in dB for each of the barriers that is in the line of sight projected from point A to point B (if there are M barriers between the points, then the sum of all the barrier losses should be calculated).

In the above expression, the path_loss follows this model:

$$\text{Loss(dB)} = -37.1 + 20 \log_{10}(\text{Distance}_{feet}) + 20 \log_{10}(\text{frequency})$$

In this expression, frequency is in MHz. For the example described here, a few of these parameters become constant for a given channel, namely, $G_{TX}$, MP, barrier_loss, and $20 \log_{10}$ (frequency). Thus, the reduced propagation model before the receiving antenna gain becomes: $RSSI(r) = P_{TX} + C - 20 \log_{10}(r)$, where C is a constant and r is a short form of $\text{Distance}_{feet}$.

For purposes of this discussion, the following three observations should be noted. First, when distance is fixed, which is the case when considering two access devices that have been installed in place, the receiving signal in dBm is proportional to the transmit power. Attenuation is defined to be the signal loss calculated from the transmit power level to the received power level of the received signal, and this attenuation represents a distance metric that indicates the RF distance between access devices. In other words, $ATTN_{A-B} = \text{Power}_{TX\_A} - \text{Power}_{RX\_B}$. Second, the receive signal is typically measured in dBm units. Power expressed in dBm can be converted into an equivalent expression using milliwatts (mW) as units. Third, a relationship or expression should be used to consider the aggregate effect of neighboring access device interference. The interfering effect will be higher with more interfering signals, and the receive signal amplitude will also be higher with more interfering signals. Accordingly, there is not necessarily a single unique mathematical equation that can be accurately applied in all cases since the interfering signals may or may not collide at the same time. In certain embodiments, the aggregate effect is chosen to be the sum of the receive signals in mW units.

The 802.11 Specification identifies particular signal sensitivities corresponding to different desired bit rates. For example, for a bit rate of 1 Mbps, the signal sensitivity should be −80 dBm, for a bit rate of 11 Mbps, the signal sensitivity should be −76 dBm, and for a bit rate of 54 Mbps, the signal sensitivity should be −65 dBm. The specified signal sensitivities are applied as follows. Any given 802.11 compliant mobile unit should be able to sustain a particular bit rate given the corresponding signal sensitivity (or strength). For example, a given mobile unit should sustain 11 Mbps when the supplied signal strength is −76 dBm. Of course, it is possible for a mobile unit to achieve a better bit rate than that specified by the 802.11 standard. During network planning, the site planner usually has a desired throughput number in the middle range of the available 802.11 bit rates. This throughput number is referred to herein as the "coverage rate." For example, if the coverage rate is 11 Mbps, then the network administrator will configure the wireless network to support 11 Mbps.

Figure 3:
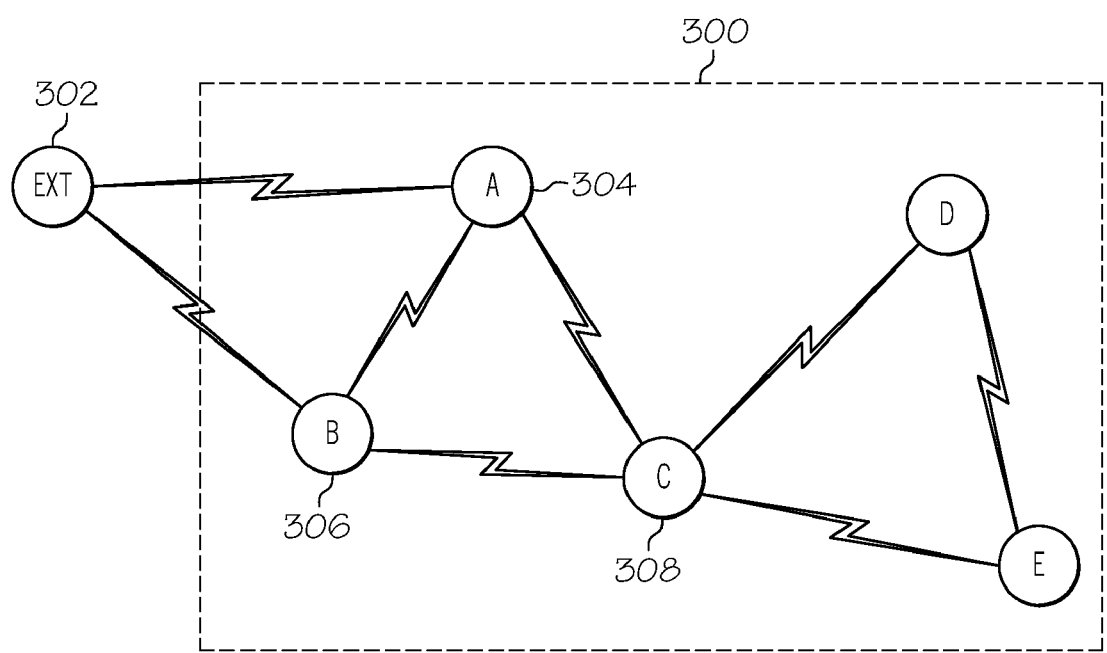
FIG. 3 is a schematic representation of wireless access devices in a wireless network, in addition to one wireless access device that is external to the wireless network.

A practical wireless network might be subject to external interference caused by wireless devices, such as wireless access devices, that do not formally "belong" to that wireless network. For example, one WLAN may be maintained and managed by a first company, a second WLAN may be maintained and managed by a second company, and the network equipment for the two companies may be physically located within close proximity. Thus, the wireless access devices supported by the first company may interfere with the wireless access devices supported by the second company, and vice versa. In this regard, FIG. 3 is a schematic representation of wireless access devices in a wireless network 300, in addition to one wireless access device that is external to the wireless network 300 (referred to herein as an external wireless access device 302). FIG. 3 depicts a situation where external wireless access device 302 is within RF range of wireless access device 304 and wireless access device 306 (both of which are part of wireless network 300). Consequently, depending upon the respective channel assignments and the transmit power level of external wireless access device 302, there might be interference between external wireless access device 302 and wireless access devices 304 and/or 306.

A WLAN of the type described herein supports an automated self-configuration technique for the wireless access devices. This self-configuration technique automatically determines channel assignments and preferred transmit power levels for the wireless access devices in the WLAN, based upon empirical RF-based data that is collected by the wireless access devices themselves. The RF operating data is collected and processed by the controller after the wireless access devices have been physically located, positioned, installed, and otherwise prepared for RF operation. The operating parameters of the wireless access devices are determined and set in response to empirical data that is derived from wireless test signals communicated between the wireless access devices. This procedure allows a network administrator to "fine tune" the WLAN after the equipment is installed, and in an ongoing manner (e.g., for periodic maintenance) if needed.

Figure 4:
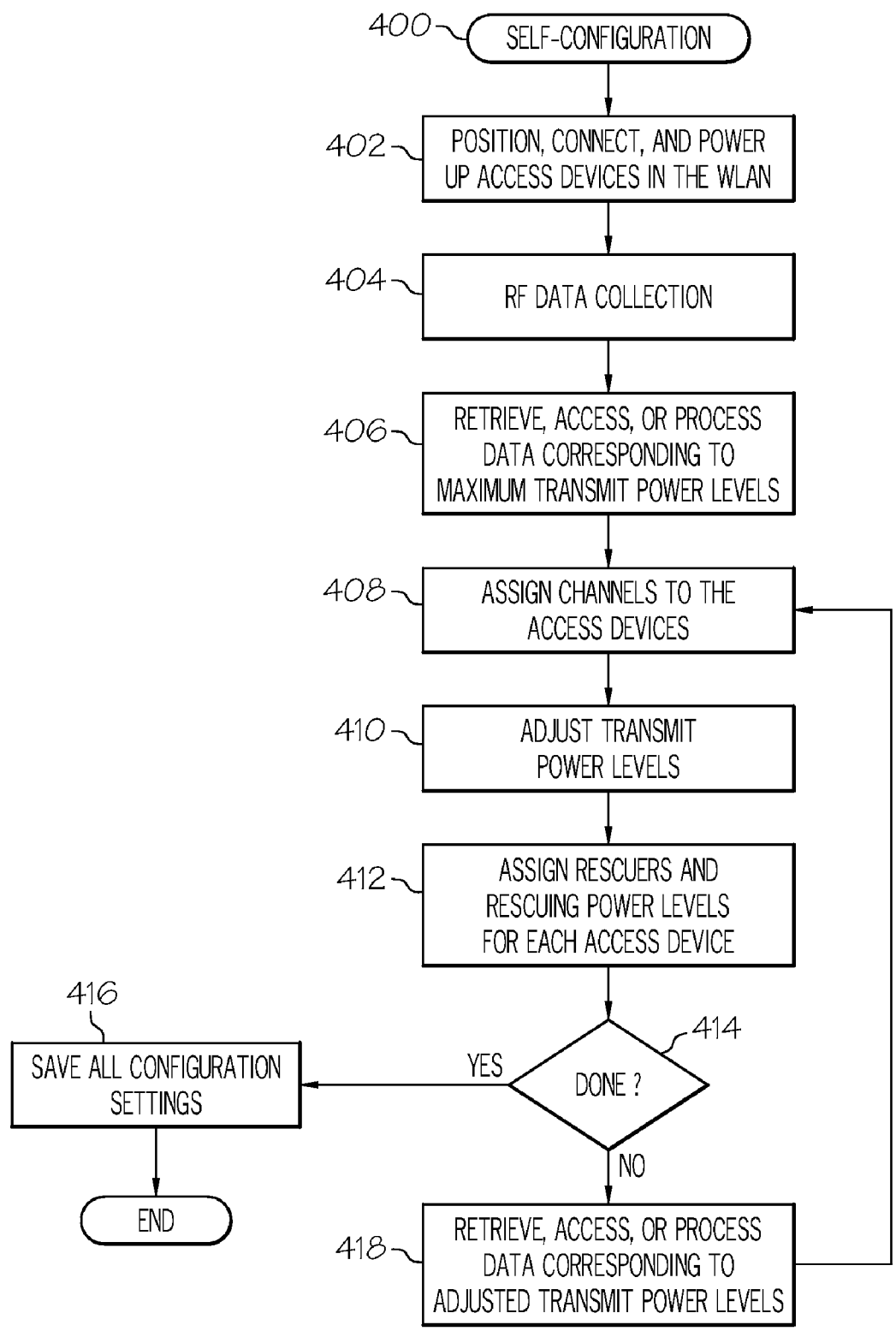
FIG. 4 is a flow diagram that illustrates an embodiment of a self-configuration process for wireless access devices.
Figure 5:
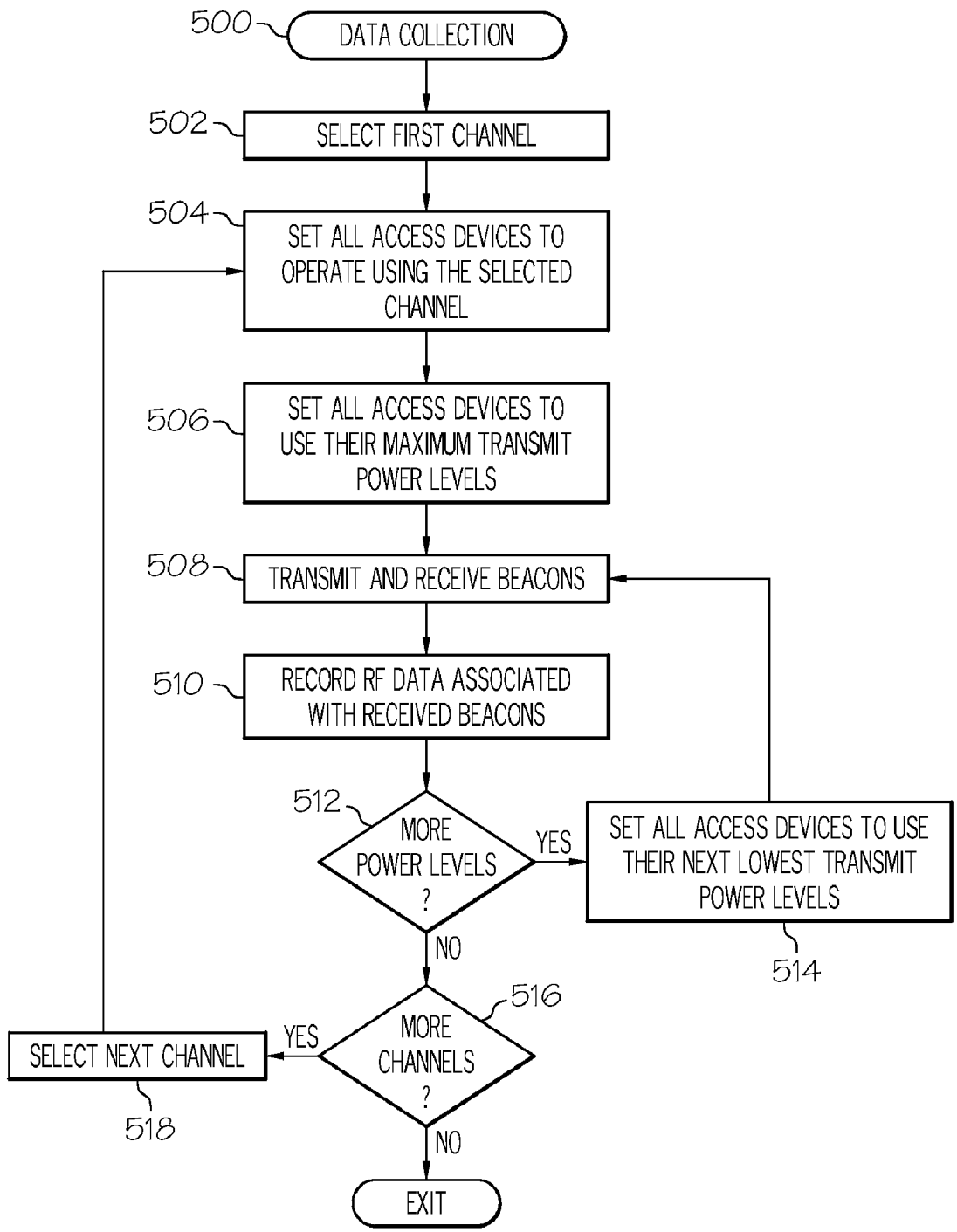
FIG. 5 is a flow diagram that illustrates an embodiment of a data collection process, which may be utilized in the self-configuration process depicted in FIG. 4.
Figure 6:
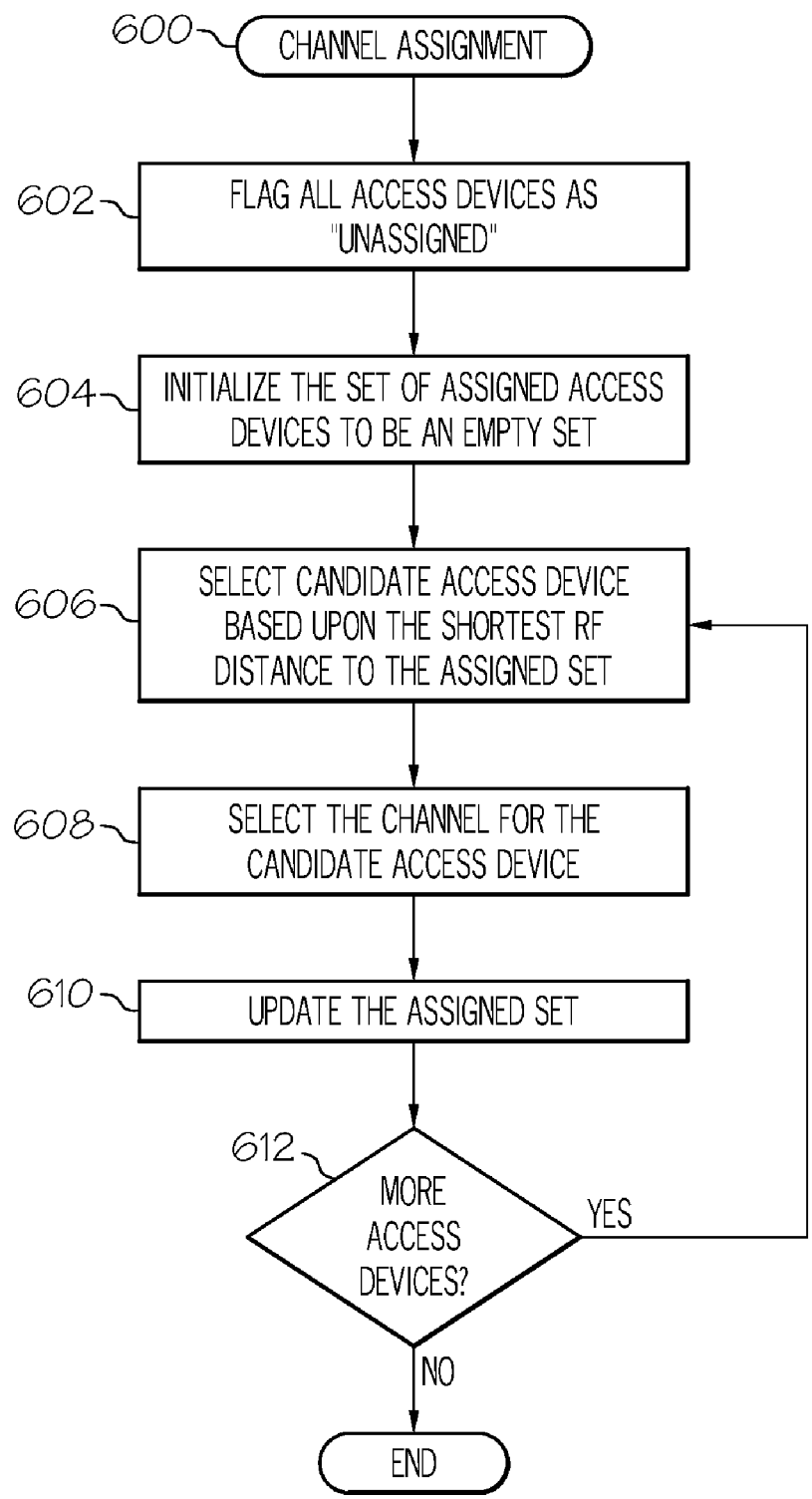
FIG. 6 is a flow diagram that illustrates an embodiment of a channel assignment process, which may be utilized in the self-configuration process depicted in FIG. 4.

FIG. 4 is a flow diagram that illustrates an embodiment of a self-configuration process 400 for wireless access devices. FIG. 5 is a flow diagram that illustrates an embodiment of a wireless data collection process 500, which may be utilized in self-configuration process 400. FIG. 6 is a flow diagram that illustrates an embodiment of a channel assignment process 600, which may be utilized in self-configuration process 400. The various tasks performed in connection with any of these processes may be performed by software, hardware, firmware, or any combination thereof For illustrative purposes, the following description of these processes may refer to elements mentioned above in connection with FIGS. 1-3. In practice, portions of a given process may be performed by different elements of the described system, e.g., a wireless access device, a central controller, a wireless switch, or the like. It should be appreciated that a process shown and described here may include any number of additional or alternative tasks, the tasks shown in the figures need not be performed in the illustrated order, and a process may be incorporated into a more comprehensive procedure or process having additional functionality not described in detail herein.

Referring to FIG. 4, self-configuration process 400 can be performed at any time after the wireless access devices have been located, installed, and are otherwise prepared for operation. Thus, process 400 includes a task 402, which is associated with the positioning, connecting, and powering of the wireless access devices in the network. As mentioned previously, the preferred deployment utilizes at least one central controller to carry out at least some of process 400. Accordingly, the controller will also be installed and set up as needed to support process 400. The self-configuration procedure itself can be initiated in any appropriate manner, e.g., by activation of a switch or button on the controller or one of the wireless access devices, by manipulation of a user interface of a computer terminal, or the like.

This embodiment of process 400 continues by performing RF data collection (task 404) for the wireless network. This data is referred to as "RF data" because the data is indicative of certain RF characteristics, properties, or criteria corresponding to the wireless access devices in the network. Wireless data collection is preferably performed during an automated calibration period where the access devices automatically perform the RF functions needed to obtain the desired RF data. In certain embodiments, the controller commands the access devices to transmit their respective test beacons during task 404. FIG. 5 depicts an exemplary data collection process 500, which may be performed during task 404. Process 500 may begin by selecting a first or initial operating channel for the access devices (task 502). As is understood by those skilled in the art, a wireless access device will usually be restricted to a certain limited list of available operating channels, and that list can be region-specific. Moreover, even though a variety of channels may be available, network administrators usually narrow the list such that it only includes channels having non-overlapping frequency ranges (in an attempt to avoid or reduce interference). Regarding task 502, the particular operating channel can be arbitrarily selected, for reasons that will become apparent later.

In accordance with the preferred embodiment of process 500, all of the access devices are controlled, commanded, or otherwise set to operate using the selected channel (task 504). In addition, all of the access devices are controlled, commanded, or otherwise set to use their maximum transmit power levels (task 506) for the selected channel. In practice, all of the access devices might have the same maximum transmit power level. Alternatively, any number of different maximum transmit power levels can be utilized throughout the wireless network. The maximum transmit power level for an access device may depend on a number of factors, such as: the operating channel or channels; the geographic region of deployment; the particular design of the access device; user preferences; or the like (the maximum transmit power level for an access device is typically within the range of about 15-25 dBm). In certain embodiments, the maximum transmit power level for each access device is predetermined or known a priori by the controller. Thus, the controller can store the maximum transmit power levels in a suitably formatted table or data structure (e.g., in memory element 208 shown in FIG. 2), and this table can be accessed by the controller during task 506. In this regard, the controller can retrieve the maximum transmit power level for each access device, generate a suitably formatted command or instruction, and send the commands or instructions to the access devices. Upon receipt of those commands/instructions, the access devices adjust their transmit power levels in an appropriate manner.

Next, the wireless access devices transmit and receive wireless calibration signals for a designated period of time, using the wireless channel selected in task 502. All of the access devices will be transmitting/receiving the wireless signals on the same channel, and at their respective maximum transmit power levels. In preferred embodiments, the access devices transmit and receive beacons (task 508) to and from each other in a non-synchronized manner. In accordance with established techniques and technologies, wireless network beacons are typically sent once every 100 milliseconds (i.e., ten beacons per second), and a beacon transmission lasts for less than one millisecond. Accordingly, the probability of beacon collision during task 508 is relatively low, even if several access devices are transmitting beacons concurrently. Moreover, even if beacon collisions occur, the access devices can utilize conventional back-off techniques to resolve the collisions. The duration of task 508 is chosen to ensure that all of the access devices have enough time to successfully exchange beacons, and that each access device successfully receives enough beacons from all other access devices that are within operating range. For example, the duration of task 508 may be between one and ten seconds, although different time periods can be used.

Notably, beacons from potentially interfering external access devices may also be received during task 508. In other words, a given wireless access device within the network being configured could receive any number of beacons from other access devices within that network, and any number of beacons from external access devices that are not actually part of that network. Referring to FIG. 2, for example, wireless access device 304 (which is located in wireless network 300) can receive beacons from wireless access devices 306 and 308 (both located in wireless network 300), along with beacons from external wireless access device 302. As described in more detail below, self-configuration process 400 leverages the information derived from beacons received from external access devices to address the effects of potentially interfering external access devices.

During the transmit/receive time period, or at any time thereafter, the controller records and saves the RF data that is associated with the received beacons (task 510). The exemplary embodiment described herein records and processes at least the following information associated with each received beacon: an identifier of the transmitting access device; a quantity related to the received signal strength or power level; and the transmit power level (also referred to herein as the beacon transmit power level). The identifier uniquely identifies the transmitting access device within the wireless network. Moreover, the identifier will indicate whether or not the transmitting access device is a legitimate member of the wireless network or an external access device. Thus, if the controller does not recognize the identifier as one belonging to the wireless network, it will flag the transmitting access device as an external device. In preferred embodiments the identifier is the MAC address of the transmitting access device. Alternatively, the identifier may be an IP address, a serial number, a user-assigned tag, or the like. The received power level and the transmit power level may both be recorded in dBm units, as explained above. Notably, the transmit power levels need not be conveyed in the received beacons because the controller preferably has a priori knowledge of the transmit power levels.

Data collection process 500 may be associated with a quick calibration scan or a comprehensive calibration scan. For a quick scan, process 500 collects RF data using the maximum transmit power levels only. For a comprehensive calibration scan, process 500 collects RF data at different transmit power levels—for example, data can be collected for each possible transmit power level. Although a comprehensive scan may provide increased accuracy, it does so by increasing the calibration time. In this regard, if more power levels remain for calibration (query task 512), then process 500 will control, command, or otherwise set the access devices to use their next lowest transmit power levels (task 514) for the selected channel. Alternatively, task 514 could command the access devices to transmit at any designated power level that has not yet been used in process 500. After task 514 changes the transmit power levels of the access devices, process 500 returns to task 508 to collect additional RF data. Thus, the loop defined by tasks 508, 510, 512, and 514 can be repeated until all of the desired RF data has been obtained. If query task 512 determines that all of the desired transmit power levels have been scanned, then process 500 can proceed to query task 516.

In preferred embodiments, data collection process 500 collects data only for the maximum transmit power levels of the access devices. Accordingly, query task 512 and task 514 are optional, and query task 516 would be performed immediately following the first iteration of task 510. For this embodiment, query task 516 checks whether more wireless channels need to be scanned. If so, then process 500 will select the next operating channel to be calibrated and return to task 504 to repeat the RF data collection for the new channel. Thus, process 500 forms a loop such that RF data is collected for all of the wireless channels of interest. Accordingly, process 500 exits if query task 516 determines that all of the desired channels have been tested. In this manner, process 500 collects a comprehensive body of RF data for the access devices.

The collected RF data can be processed during data collection process 500 or at any time thereafter. More specifically, the controller will calculate an RF attenuation value for each transmitter-receiver pair of access devices for each combination of transmit power level and channel. The attenuation value, expressed in dB, is a metric that is indicative of both the physical distance and the RF distance between the respective pair of access devices. The attenuation value indicates the RF proximity between the pair of access devices for the given channel and transmit power conditions. Thus, a relatively low attenuation value is indicative of two access devices that are relatively close together, while a relatively high attenuation value is indicative of two access devices that are relatively far apart. The attenuation values are used for purposes of channel assignment (described in more detail below). An abbreviated listing of exemplary data for one channel is provided in Table 1 below.

TABLE 1

Collected and Processed RF Data

| CH | Rx ID | Tx ID | Tx Pwr (dBm) | Rx Pwr (dBm) | ATTN (dB) |
|---|---|---|---|---|---|
| 1 | A | B | 20 | −80 | 100 |
| 1 | A | C | 20 | −63 | 83 |
| 1 | A | EXT | N/A | −79 | N/A |
| 1 | C | A | 20 | −65 | 85 |
| 1 | C | B | 20 | −70 | 90 |
| 1 | C | D | 20 | −82 | 102 |
| 1 | C | E | 20 | −87 | 107 |

In Table 1, "CH" is the channel number, "Rx ID" is the identifier (e.g., MAC address) of the receiving access device, "Tx ID" is the identifier (e.g., MAC address) of the transmitting access device, "Tx Pwr" is the transmit power level of the transmitting access device, "Rx Pwr" is the received signal strength detected at the receiving access device, and "ATTN" is an attenuation metric calculated according to the expression $ATTN = T_X\_Pwr - R_X\_Pwr$. The attenuation value serves as an indicator of the RF distance between the transmitting access device and the receiving access device. Of course, an actual table of RF data will include many more entries corresponding to different channels, additional pairs of access devices, and (in some embodiments) different transmit power levels for the access devices.

Referring again to FIG. 4, after completion of RF data collection (task 404), this embodiment of self-configuration process 400 retrieves, accesses, and/or processes the RF data corresponding to initial transmit power levels, e.g., the maximum transmit power levels (task 406). Although process 400 may begin by processing data corresponding to other transmit power levels, the preferred embodiment assumes that other transmit power levels may not be available (in other words, the preferred embodiment assumes that a quick calibration scan was performed). In practice, task 406 may consult one or more tables of data that include computed attenuation values for the different pairs of access devices.

Eventually, process 400 uses the recorded RF data to temporarily assign or select operating channels to the access devices in the wireless network (task 408). The goal here is to assign channels such that they are effectively distributed to avoid or reduce interference (both internal and external) among the access devices. In practice, each access device will be assigned one operating channel to use during normal operation. Thus, adjacent access devices should not be assigned the same wireless channel. However, due to the limited number of available channels, the allocation of different channels is performed in an intelligent manner that is influenced (or based upon) by the RF data collected during task 404. In the United States, for example, the 802.11(g) Specification identifies only three non-overlapping and non-interfering channels: CH1, CH6, and CH11. Consequently, if the wireless network includes more than three access devices, then at least one channel must be reused. Moreover, channels should be assigned in a manner that contemplates possible interference by external access devices that operate using the same available channels.

FIG. 6 depicts an exemplary channel assignment process 600, which may be performed during task 408. Process 600 may begin by flagging or designating all of the access devices as "unassigned" (task 602). As used in the context of process 600, an "unassigned" access device refers to an access device to which an operating channel has not yet been assigned. Process 600 also initializes the set of assigned access devices to be an empty set (task 604). In other words, at the beginning of process 600 there are no access devices having a channel assigned thereto. Next, process 600 selects the next candidate access device for purposes of channel assignment (task 606). In particular, the next candidate access device is chosen to be the access device that has the shortest RF distance to the set of assigned access devices. The selection of the candidate access device is described in more detail below in connection with FIG. 7. Obviously, the first time task 606 is invoked, there is nothing in the assigned set, and every access device has equal RF distance (e.g., zero) to the assigned set. Accordingly, any of the access devices in the wireless network can be selected as a starting point. In certain embodiments, the resulting effect is that the first access device in the list of unassigned access devices would be picked as the candidate. Referring to FIG. 3 as an example, access device 304 is picked as the first candidate access device.

Once the candidate access device is chosen, process 600 will attempt to assign a channel to the candidate access device (task 608). The channel selection attempts to obtain the lowest aggregate RF interference from other access devices, which includes interference from access devices within the designated network and interference from external access devices that are not part of the designated network. More specifically, task 608 calculates the aggregate RF interference for each channel and then chooses the channel that has the lowest aggregate interference value. In the preferred embodiment, the aggregate RF interference is computed as the sum of the received signal strength in milliwatts. After the channel has been selected for the candidate access device, process 600 will flag/designate the candidate access device as being assigned and will add that access device to the set of assigned access devices (task 610). Referring again to FIG. 3 as an example, access device 304 is within RF range of external access device 302, which is assumed operating at channel 11, the received signal strength by access device 304 is assumed to be −65 dBm or $10^{-6.5}$ mW. Since no other access devices have been assigned yet, the RF interference for channel 1 and for channel 6 is zero mW. Hence, it is reasonable to assign channel 1 to device 304.

Thereafter, process 600 checks whether there are any more access devices in the unassigned set (query task 612). If not, then all of the access devices have assigned channels and, therefore, process 600 ends. If, however, more access devices remain unassigned, then process 600 returns to task 606 to select the next candidate access device. This loop in process 600 is repeated until channels have been assigned to all of the access devices in the network.

For purposes of illustration, the following example assumes that this loop of process 600 is performed two more times. On the second iteration of task 606, access device 306 (see FIG. 3) is picked as the next candidate access device. At task 608, the RF interference is calculated as follows. For channel 1, the neighbor access device 304 is transmitting at 20 dBm, with 82 dB of attenuation between access devices 304 and 306. The received signal strength at access device 306 is 20 dBm−82 dB, or −62 dBm, which equals $10^{-6.2}$ mW. Since no access device is operating on channel 6, the interference for channel 6 is 0 mW. For channel 11, external access device 302 has a interference with access device 306 of −70 dBm, which equals $10^{-7}$ mW. Thus, the channel with the least amount of interference is channel 6, and this channel is assigned to access device 306.

On the third iteration of task 606, on process 605, access device 308 is picked as the next candidate access device. At task 608, the RF interference is calculated as follows. For channel 1, the neighboring access device 304 is transmitting at 20 dBm, with 85 dB of attenuation between access devices 304 and 308. The interference at access device 308 is now 20 dBm−85 dB, or −65 dBm, which equals $10^{-6.5}$ mW. On channel 6, neighboring access device 306 is transmitting at 20 dBm, with 87 dB of attenuation between access devices 306 and 308. Therefore, the interference at access device 308 is now at 20 dBm−87 dB, or −67 dBm, which equals $10^{-6.7}$ mW. On channel 11, the external access device 302 has an interference with access device 308 of −90 dBm, which equals $10^{-9}$ mW. Thus, the channel with the least amount of interference for access device 308 is channel 11, and this channel is assigned to access device 308.

Figure 7:
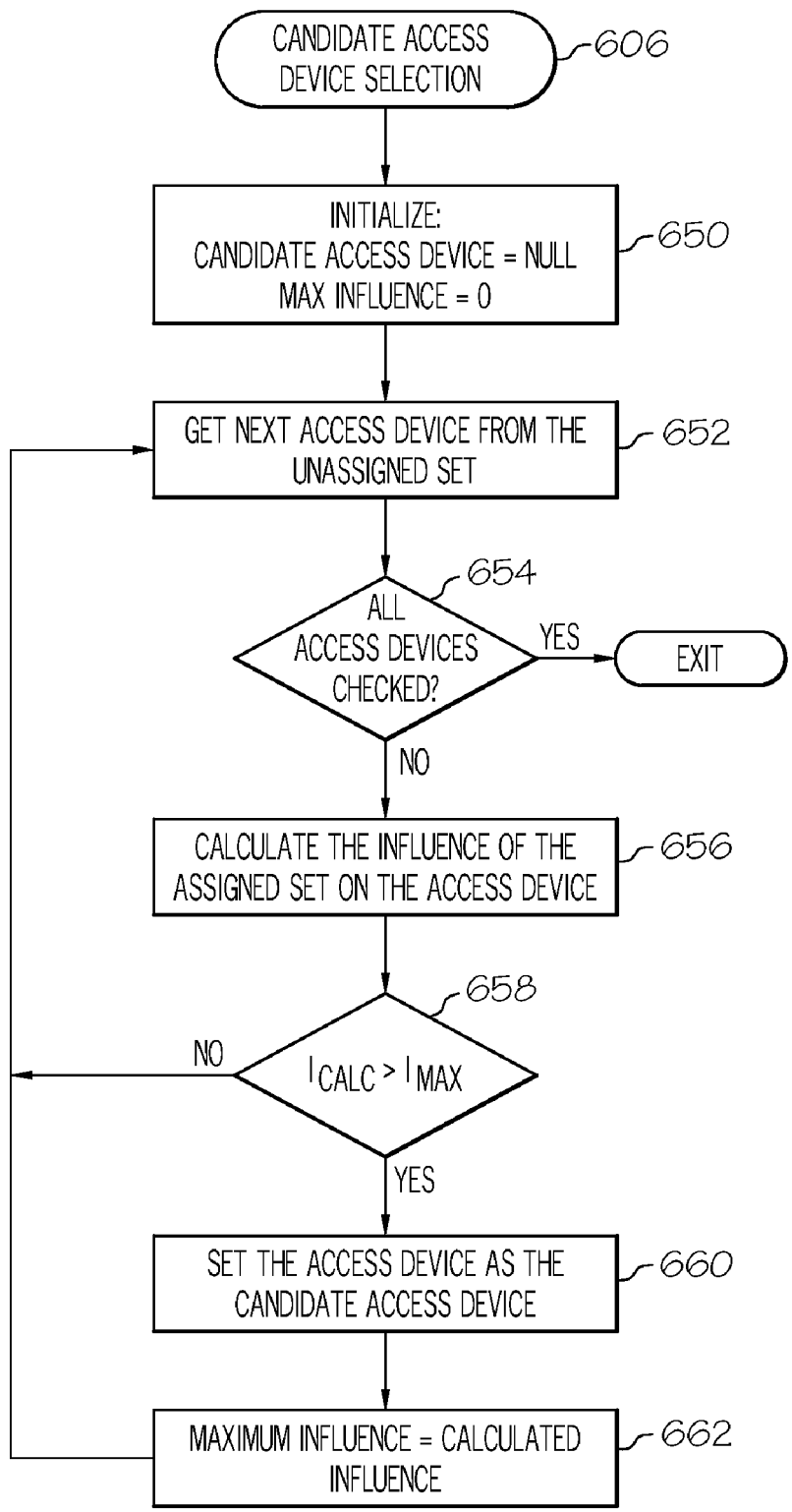
FIG. 7 is a flow diagram that illustrates an embodiment of a candidate access device selection routine, which may be performed during the channel assignment process shown in FIG. 6.

FIG. 7 is a flow chart that depicts the manner in which candidate access devices are selected during task 606 of process 600. Again, task 606 is performed to select the candidate access device having the shortest RF distance to the assigned set of access devices. This approach is followed to distribute the allocation of resources, i.e., channels in this case, evenly and to consequently minimize interference between neighboring access devices. This technique also optimizes the allocation of channels within the network.

In the preferred embodiment, the shortest RF distance is determined by calculating the aggregate RF interference from the assigned access devices, while disregarding the channel information. In other words, process 600 assumes that access devices are operating at the same channel, and that the assigned access devices transmit at their current power. Then, process 600 calculates the aggregate RF interference for all unassigned access devices. The access device having the strongest RF interference is considered to be the access device with the shortest RF distance to the set of assigned access devices.

The candidate selection may begin by initializing Candidate Access Device to be null, and by initializing the maximum influence to be zero (task 650). As used here, "null" means that there is no candidate access device at this time, i.e., process 600 has not yet determined the candidate access device. Thereafter, task 652 is performed to get the next access device from the unassigned set, and query task 654 checks whether all access devices in the unassigned set have been checked for candidacy. If all access devices in the unassigned set have been checked for candidacy, then the candidate selection routine exits and process 600 proceeds to task 608 (see FIG. 6). On the other hand, if query task 654 determines that there are more access devices in the unassigned set to be checked, then the candidate selection routine proceeds by picking the next access device in the unassigned set and calculating the influence of the assigned set on this particular access device (task 656). In this embodiment, the calculated influence is compared to the maximum influence (query task 658). If the calculated influence is greater than the maximum influence, then the access device is set as the candidate access device (task 660) for purposes of the remainder of process 600. After selecting the candidate access device in this manner, the maximum influence value is updated (task 662) such that it now equals the calculated influence value determined during task 656. Following the completion of task 662, task 652 can be reentered. Notably, task 652 is also reentered if the calculated influence is less than or equal to the maximum influence (query task 658).

For illustrative purposes, refer again to FIG. 3. The first time task 606 is called, there is nothing in the assigned set, all RF interferences for all access devices are zero, and access device 304 is selected as the candidate access device. The second time task 606 is called, it first calculates the interference influence on access device 306. For this example, this interference influence is 20 dBm−85 dB, or −65 dBm, which equals $10^{-6.5}$ mW. The interference influence on access device 308 is 20 dBm−87 dB, or −67 dBm, which equals $10^{-6.7}$ mW. Therefore, access device 306 has the shortest RF distance to the assigned set, and access device 306 is selected as the candidate access device.

Referring again to FIG. 4, after assigning channels to the wireless access devices (task 408), this embodiment of self-configuration process 400 adjusts the transmit power levels of the access devices (task 410), if necessary. It should be noted that task 410 need not be performed if all of the access devices have been assigned different operating channels. Under such conditions, each access device can be safely operated at its maximum transmit power without any risk of interference. In many deployments, however, some channels will be reused throughout the wireless network. Thus, task 410 can be performed to adjust the transmit power of the access devices in an attempt to reduce interference between neighboring access points that might be within RF operating range of each other. The adjusted transmit power for a given access device may be influenced by (or otherwise based upon) some of the RF data recorded during task 404.

Figure 8:
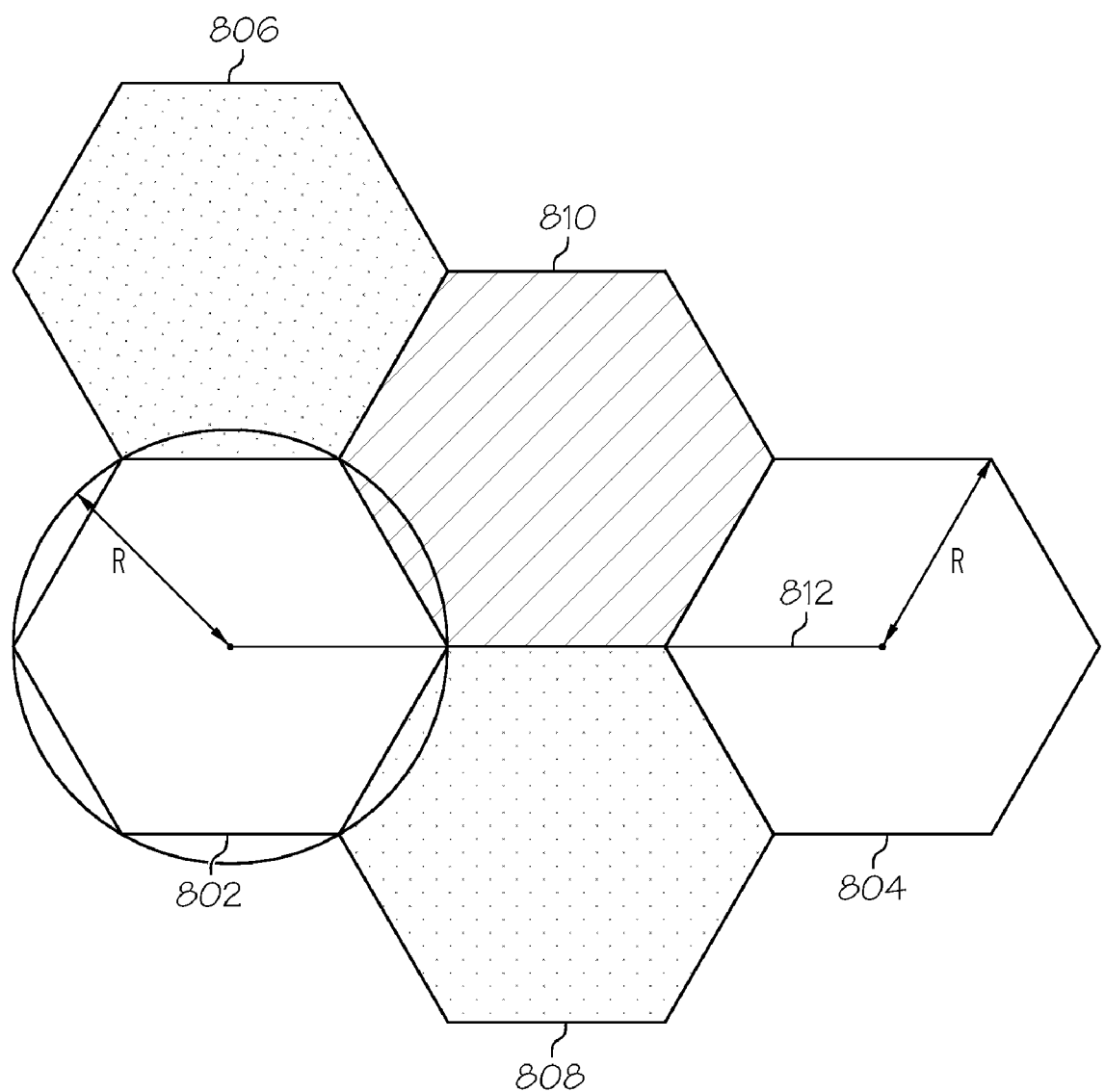
FIG. 8 is a diagram that illustrates exemplary channel assignments and relationships between wireless access devices in a wireless network.

Transmit power adjustment will be described with reference to FIG. 8, which is a diagram that illustrates exemplary channel assignments and relationships between wireless access devices in a wireless network. Each hexagon in FIG. 8 represents an estimated, ideal, or modeled RF coverage area for an access device. In FIG. 8, access devices 802 and 804 have been assigned a first channel, access devices 806 and 808 have been assigned a second channel (indicated by the specks in FIG. 8), and access device 810 has been assigned a third channel (indicated by the hatching in FIG. 8). FIG. 8 and the following description assumes that all of the depicted access devices are within operating range of each other and, therefore, are susceptible to interference caused by one another.

As an initial matter, the transmit power adjustment routine can begin with any one of the access devices, referred to here as the first adjusted access device. If the channel assigned to the first adjusted access device is different than the channel(s) assigned to all of its adjacent access devices, then the transmit power of the first adjusted access device need not be changed (i.e., it can remain at the maximum transmit power level). For any pair of access devices that share a common wireless operating channel, the goal is to set the transmit power to be high enough for RF coverage purposes, but low enough to not cause interference. FIG. 8 depicts a typical honeycomb arrangement where, under ideal conditions, non-overlapping coverage will be achieved by intelligent arrangement of access devices and intelligent assignment of channels to the access devices. However, for various reasons (e.g., strong interfering signals from external sources), it may be necessary to assign the same operating channel to adjacent access devices.

Although not depicted in FIG. 8, in a situation where two adjacent access devices have been assigned the same channel, the following transmit power adjustment scheme can be utilized. First, the minimal signal strength ($S_{MIN}$) for a desired coverage is obtained from an appropriate sensitivity table, such the following one derived from IEEE Specification 802.11.

TABLE 2

Signal Sensitivity

| Bitrate (Mbps) | Signal Sensitivity (dBm) |
| --- | --- |
| 1 | −80 |
| 2 | −75 |
| 5.5 | −75 |
| 6 | −82 |
| 9 | −81 |
| 11 | −76 |
| 12 | −79 |
| 18 | −77 |
| 23 | −74 |
| 36 | −70 |
| 48 | −66 |
| 54 | −65 |

Assuming the attenuation value between the two adjacent access devices is represented by the variable L, if the first access device is allowed to transmit at a power level of $S_{MIN}$+L, then the received signal at the second access device will have a level equal to $S_{MIN}$. However, that level would provide more than enough coverage when the two adjacent access devices are active, and the transmit power level can be scaled back to reduce the coverage radius such that it won't overlap with the coverage area of the adjacent access device.

For this example, assume that the distance between the two access deceives D feet, and that the desired coverage radius is R feet. With these assumptions, R≈0.6D. Based the propagation loss model described above, the factor of 0.6 translates to a linear dB of −2.0 dB. Therefore, the base form of the maximum transmit power between two adjacent access devices operating on the same channel is $P_{TX}$=RSSI+L−2.

If there is an intervening access device between two other access devices that operate using the same channel (e.g., access devices 802 and 804 in FIG. 8), and assuming that the access device placement is as shown in the model, then the distance between the two access devices is approximately 3R, where R is the ideal modeled coverage radius. The line 312 in FIG. 8 represents this 3R distance. Accordingly, the coverage radius is simply one-third of the RF distance between access devices 802 and 804. The factor of one-third translates to a linear dB reduction of 5.0. Accordingly, the desired transmit power becomes $P_{TX}$=RSSI+L−5. The preferred embodiment assumes that a honeycomb arrangement will be generated by default and, therefore, adjustments based on the distance of 3R are utilized. Note that one need not worry about the case where the access device has more than one intermediate neighbor, since in that case the restricting transmit power would be greater than the power calculated by the case where the access device has just one intermediate neighbor, and therefore would not be retained for further consideration in power assignment.

The transmit power level adjustment procedure is executed for each access device in the wireless network. It should be appreciated that process 400 adjusts the transmit power levels in a progressive manner (one access device at a time) that strives to minimize or reduce channel interference among the access devices. Notably, adjustment of the transmit power levels is based upon the RF data collected during task 404, and is based upon the attenuation values calculated from the raw RF data. Moreover, this first iteration of transmit power adjustment begins with the assumption that each access device is set at its maximum transmit power level.

Referring again to FIG. 4, after adjusting the transmit power levels of the access devices, the adjusted levels are recorded and stored for subsequent processing. At the completion of task 410, each wireless access device in the wireless network will have an assigned (temporary) operating channel and an adjusted (temporary) transmit power level, both of which are influenced by the collected RF data. At this time, the illustrated embodiment of process 400 assigns rescuers and rescuing power levels for each access device (task 412), based upon at least some of the recorded RF data, the selected channels, and the adjusted transmit power levels. In this context, a "rescuer" represents an access device in the network that compensates for the failure, shutdown, or disabling of a nearby access device. For example, if access device 308 in FIG. 2 fails, then access devices 304 and 306 may serve as rescuers. In that situation, the transmit power levels of access devices 304 and 306 may need to be boosted to provide additional coverage for the area normally supported by the failed access device 308. In a typical wireless network, three neighboring access devices serve as rescuers for a failed access device. That said, the actual number of rescuers for a given access device may be more or less than three.

In certain embodiments, the number of rescuers for each access device is a global parameter that can be configured by the user, with a default of three if the user does not specify otherwise. Accordingly, for this example, task 412 will determine the three nearest access devices to serve as the rescuers for a designated access device. Again, the determination of the three closest neighbors is influenced by the attenuation values calculated previously.

Then, task 412 will determine the desired rescuing power levels for each of the rescuer devices. This allows the rescuers to raise their transmit powers to cover the area that was covered by a defective or failed access device. Notably, the rescuers need not operate on the same channel. The additional power needed from each rescuer is individually calculated; the transmit power needed to cover the failed access device is such that the signal strength at the failed device is equal to the threshold sensitivity for the desired coverage rate for the system, which may be user configurable. In certain embodiments, the default coverage rate is set at 18 Mbps. As mentioned above, the desired coverage rate will be associated with a minimum sensitivity, in dBm. This minimum sensitivity parameter is used to calculate how much coverage power the rescuer access device will need to provide to compensate for the failed device.

For example, assume the attenuation value from a first access device to a second access device is 94 dB, and the desired coverage rate is 18 Mbps (corresponding to a signal sensitivity of −77 dBm from the sensitivity table). Under these assumptions, the required rescuing power for the second access device to cover for the first access device is: Rescuer_Power=−77 dBm+94 dB=17 dBm. Thus, if the first access device fails, the transmit power of the second access device will be upwardly adjusted to 17 dBm. In practice, the total amount of compensating transmit power will be allocated between the three rescuer devices using a similar approach.

After task 412 assigns rescuers and rescuing power levels, process 400 may check (query task 414) whether additional processing iterations are needed. If processing is complete, then all of the temporary configuration settings are saved for actual deployment (task 416). In this regard, the temporary channel assignments, the temporary transmit power levels, the rescuer assignments, and the rescuing power levels are recorded and actually implemented at the access devices in the wireless network. The configuration data can be saved at the access devices themselves, at the controller, and/or at one or more wireless switches in the network. This effectively configures the access devices for operation using the final assigned channels and the final adjusted power levels. If query task 414 determines that another processing iteration is required, then process 400 will retrieve, access, or process the data corresponding to the adjusted transmit power levels (task 418) and return to task 408 to repeat the routines for channel assignment, transmit power adjustment, rescuer assignment, and rescuing power level determination.

The loop defined by tasks 408, 410, 412, 414, and 418 can be repeated to obtain more accurate results because the first iteration is based upon the assumption of maximum transmit power. However, maximum transmit power levels may not be very realistic in an actual deployment. Accordingly, subsequent iterations of these primary processing routines utilize the adjusted transmit power levels for each access device, as determined by the immediately preceding iteration. For example, channel assignments based on the adjusted transmit power levels may be different than those based on the maximum transmit power levels. More specifically, although the RF distance or signal attenuation between two access devices is substantially independent of the transmit power level, the interfering influence of one access device on another access device will vary in accordance with the transmit power level.

For example, assume that CH1 has been assigned to a first access device, and that another channel is being assigned to a second access device. Also assume that the second access device is associated with the following interference measures: 0 dBm for CH1; −85 dBm for CH6; and −82 dBm for CH11. If the maximum transmit power for the first access device is 20 dBm, and the attenuation value between the two access devices is 100 dB, then the influence of the first access device will be 20 dBm minus 100 dB, or −80 dBm. Since the interference associated with CH6 (−85 dBm) is less than −80 dBm, and since the interference associated with CH6 (−85 dBm) is less than the interference associated with CH11 (−82 dBm), the first iteration of task 408 will assign CH6 to the second access device.

If, however, the second iteration of task 408 assumes that the first access device is set to an adjusted transmit power level of 10 dBm (rather than its maximum of 20 dBm), then the influence of the first access device will be 10 dBm minus 100 dB, or −90 dBm. Consequently, this second iteration of task 408 will select CH1 for assignment to the second access device, since −90 dBm represents the least amount of interference compared to the interference measures associated with CH6 (−85 dBm) and CH11 (−82 dBm). This example illustrates how the adjusted transmit power levels can be utilized to "fine tune" the channel assignments. Tasks 410 and 412 are also repeated for each iteration, resulting in more accurate transmit power levels and more accurate configuration settings for rescuers.

A practical implementation of self-configuration process 400 can include any number of processing iterations or cycles. Preferred embodiments perform three iterations, which represents a good compromise between accuracy and run time.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A self-configuration method for access devices in a wireless network, the method comprising:
performing wireless data collection with the access devices during an automated calibration period by a controller commanding the access devices to transmit test beacons at specified transmit power levels on a plurality of different channels available to the wireless network, wherein each of the access devices then receives beacons from one or more transmitting access devices, the beacons being transmitted and received using the plurality of different channels;
recording radio frequency (RF) data including each access device test beacon transmit power level received during the wireless data collection;
selecting, by the controller from the plurality of different channels, a respective channel for each of the access devices, wherein the selecting is based upon the recorded RF data; and
adjusting transmit power levels for the access devices, based upon the recorded RF data and based upon the selecting.

2. The method of claim 1, wherein the performing step comprises performing wireless data collection with all of the access devices transmitting at their maximum transmit power levels.

3. The method of claim 1, wherein the recording step records RF data indicative of:
transmitting access device identifiers, wherein if the controller does not recognize the identifier as one belonging to the wireless network, flagging the transmitting access device in the RF data as an external device; and
received signal strength measurements.

4. The method of claim 3, further comprising calculating, for each received beacon and based upon the received signal strength measurements and the beacon transmit power levels, a distance metric that indicates RF distance between transmitting and receiving access devices.

5. The method of claim 1, wherein the adjusting step results in adjusted power levels for the access devices, and the method further comprises repeating the selecting step, based upon the recorded RF data and the adjusted power levels.

6. The method of claim 5, wherein repeating the selecting step results in reselected channels for the access devices, and the method further comprises repeating the adjusting step, based upon the recorded RF data and the reselected channels.

7. The method of claim 1, wherein the selecting step selects channels for the access devices in a progressive manner that strives to minimize channel interference among the access devices.

8. The method of claim 1, wherein the adjusting step adjusts transmit power levels in a manner that strives to minimize channel interference among the access devices.

9. The method of claim 1, further comprising:
assigning the selected channels to the access devices; and
configuring the access devices for operation using the adjusted transmit power levels.

10. The method of claim 1, further comprising assigning rescuer access devices to each of the access devices, based upon the recorded RF data, the selected channels, and the adjusted transmit power levels, wherein if the access device is disabled, the transmit power levels of the assigned rescuer access devices can be raised to provide additional coverage for the area normally supported by the disabled access device.

11. The method of claim 1, wherein the recording step records RF data corresponding to beacons received from at least one external access device that is not a member of the wireless network.

12. In a wireless local area network (WLAN) comprising a plurality of access devices that support wireless communication with devices within the WLAN, and comprising a controller communicatively coupled to the plurality of access devices, a self-configuration method for establishing wireless operating characteristics of the plurality of access devices, the method comprising:

the controller commanding the access devices to transmit test beacons at specified transmit power levels and on different channels available to the wireless network during an automated calibration period;

the access devices receiving the test beacons;

recording radio frequency (RF) data associated with received test beacons including each access device test beacon transmit power level;

processing, by the controller, the RF data to assign channels to the access devices;

processing, by the controller, the RF data and the assigned channels to determine adjusted transmit power levels for the access devices; and configuring, by the controller, the access devices for operation using the assigned channels and the adjusted transmit power levels.

* * * * *

UNITED STATES PATENT AND TRADEMARK OFFICE
CERTIFICATE OF CORRECTION

| | | |
|---|---|---|
| PATENT NO. | : 8,189,547 B2 | Page 1 of 1 |
| APPLICATION NO. | : 12/255445 | |
| DATED | : May 29, 2012 | |
| INVENTOR(S) | : Li | |

It is certified that error appears in the above-identified patent and that said Letters Patent is hereby corrected as shown below:

In Column 8, Line 10, delete "thereof" and insert -- thereof. --, therefor.

Signed and Sealed this
Twenty-ninth Day of January, 2013

David J. Kappos
*Director of the United States Patent and Trademark Office*